United States Patent
Chew et al.

(10) Patent No.: US 6,843,862 B2
(45) Date of Patent: Jan. 18, 2005

(54) SOLDERS

(75) Inventors: Kai Hwa Chew, Singapore (SG); Wei Chih Pan, Singapore (SG)

(73) Assignees: Quantum Chemical Technologies (Singapore) Pte Ltd, Singapore (SG); Singapore Asahi Chemical and Solder Industries Pte Ltd, Singapore (SG)

( * ) Notice: Subject to any disclaimer, the term of this patent is extended or adjusted under 35 U.S.C. 154(b) by 0 days.

(21) Appl. No.: 09/932,793

(22) Filed: Aug. 17, 2001

(65) Prior Publication Data

US 2003/0007886 A1 Jan. 9, 2003

(30) Foreign Application Priority Data

Jul. 9, 2001 (SG) ......................................... 200104071

(51) Int. Cl.[7] .............................................. B23K 35/26
(52) U.S. Cl. ...................... 148/400; 420/560; 420/561; 228/180.1
(58) Field of Search .......................... 148/400; 420/560, 420/561; 228/180.1

(56) References Cited

U.S. PATENT DOCUMENTS 5,538,686 A * 7/1996 Chen et al. ................. 420/557

FOREIGN PATENT DOCUMENTS

| JP | 09-155586 | | 6/1997 |
|----|-----------|---|--------|
| JP | 10314980 | * | 12/1998 |
| JP | 11221694 | * | 8/1999 |
| JP | 2000141078 | * | 5/2000 |
| JP | 2001058286 | * | 3/2001 |
| WO | 97/09455 | * | 3/1997 |
| WO | WO 97/43456 | | 11/1997 |
| WO | 2000018536 | * | 4/2000 |

OTHER PUBLICATIONS

International Prelimiary Examination Report, PCT Application No. PCT/GB02/00259, Nov. 28, 2003.

* cited by examiner

Primary Examiner—Sikyin Ip
(74) Attorney, Agent, or Firm—Ipsolon LLP (57) ABSTRACT

A substantially lead-free solder with enhanced properties comprises from 88.5% to 93.5% tin; from 3.5% to 4.5% silver; from 2.0% to 6.0% indium; and from 0.3% to 1.0% copper. The solder may also comprise up to 0.5% of an anti-oxidant or anti-skinning additive. A solder embodying the invention finds particular utility in wave-soldering processes where it may be used as a direct replacement for conventional tin/lead solder.

5 Claims, 6 Drawing Sheets

| Solder Temp(°C) | 63Sn/37Pb | 99.3Sn/0.7Cu | 96.5Sn/3.5Ag | ALLOY 349 | Viromet 217 | Viromet 411 | Viromet 513 | 96.5Sn/3.5Ag/3.0Bi | 95.5Sn/4.0Ag/0.5Cu | 96Sn/2.5Ag/1.0Bi/0.5Cu |
|---|---|---|---|---|---|---|---|---|---|---|
| 235 | 5.48 | 4.37 | 2.54 | 3.21 | 5.38 | 3.25 | 1.27 | 1.03 | 1.07 | 3.47 |
| 245 | 5.54 | 4.93 | 4.74 | 4.82 | 5.57 | 3.65 | 3.94 | 3.91 | 3.13 | 4.8 |
| 255 | 5.42 | 5.4 | 5.16 | 4.9 | 5.76 | 4.45 | 3.58 | 4.95 | 4.66 | 5.48 |
| 265 | 5.41 | 5.77 | 5.34 | 5.07 | 5.49 | 4.89 | 4.67 | 5.37 | 4.73 | 5.49 |

Maximum wetting force at 2.0s (mN)

| Properties | Type of alloys | | | | | | | |
|---|---|---|---|---|---|---|---|---|
| | 63Sn/37Pb | 99.3Sn/0.7Cu | 96.5Sn/3.5Ag | Viromet 217 | ALLOY 349 | Viromet HF | 96.5Sn/3.5Ag/3Bi | 95.5Sn/4Ag/0.5Cu | 96Sn/2.5Ag/0.5Cu/1Bi |
| Melting Temp.(°C) | 183 | 227 | 221 | 199-209 | 205-210 | 203-215 | 195-215 | 194-218 | 196-218 |
| CTE(um/m°C) | 23.3 | 19.3 | 22.7 | 22.5 | 22.9 | 18.6 | 23.1 | 21.5 | 14.5 |
| SG (g/ml) | 8.4 | 7.31 | 7.38 | 7.34 | 7.4 | 7.3 | 7.22 | 7.4 | 7.38 |

| Properties | Type of alloys | | | | | | | | |
|---|---|---|---|---|---|---|---|---|---|
| | 63Sn/37Pb | 99.3Sn/0.7Cu | 96.5Sn/3.5Ag | Miromet 217 | ALLOY 349 | Miromet HF | 96.5Sn/3.5Ag/3Bi | 96.5Sn/4Ag/0.5Cu | 96Sn/2.5Ag/0.5Cu/1Bi |
| Tensile Strength | 48.37 | 39.76 | 55.15 | 96.18 | 68.23 | 68.06 | 84.79 | 49.55 | 63.11 |
| Load at max load | 1.37 | 1.12 | 1.55 | 2.71 | 1.93 | 1.92 | 2.4 | 1.4 | 1.78 |
| Yield Strength (at 2% offset) | 39.53 | 32.79 | 46.39 | 70.55 | 53.89 | 54.93 | 62.34 | 38.28 | 49.26 |
| Young Modulus | 4968.91 | 10111.55 | 11437.11 | 11396.76 | 9612.28 | 10392.66 | 9963.52 | 11366.93 | 11403.57 |

| Type of Solder | Method of Soldering | Plating of Board | Type of Component | No. of lifted points | Total no of points | % of Occurrence |
|---|---|---|---|---|---|---|
| Viromet 217 | Wave 245/1.0 | Au | Diodes | 24 | 24 | 100 |
| | | | Resistors 1 | 29 | 32 | 91 |
| | | | Resistors 2 | 27 | 36 | 75 |
| | Wave 255/1.0 | Au | Diodes | 19 | 20 | 95 |
| | | | Resistors 1 | 37 | 40 | 92.5 |
| | Dip | Au | Connector | 40 | 40 | 100 |
| | | HASL | Jumpers | 22 | 32 | 69 |
| Sn/3.2Ag/0.5Bi/4In | Dip | HASL | Jumpers | 16 | 24 | 66.7 |
| Sn/3.2Ag/1Bi/6In | Dip | HASL | Jumpers | 18 | 24 | 75 |
| Sn/3.2Ag/2Bi/6In | Dip | HASL | Jumpers | 14 | 20 | 70 |
| ALLOY 349 | Dip | OSP | Connector 1 | 0 | 6 | 0 |
| | | | Resistor | 0 | 22 | 0 |
| | Dip | Au | Resistor | 0 | 20 | 0 |
| | | | Diodes | | 16 | 0 |
| Sn/4Ag/0.5Cu/1Bi | Dip | HASL | Jumpers | 15 | 24 | 62.5 |
| Sn/Ag | Dip | HASL | Jumpers | 5 | 28 | 17.9 |

FIGURE 10A  FIGURE 10B

| Type of Solder | Conc of copper (% by weight) | Dissolution rate of copper |
|---|---|---|
| Viromet 349 | 0.06312 | 0.0118406 |
| Viromet 217 | 0.05506 | 0.0112433 |
| Sn/Cu0.7 | 0.16017 | 0.0320858 |
| Sn/Ag/Cu | 0.13221 | 0.0264772 |
| Sn63/Pb37 | 0.02279 | 0.0045627 |

| Solder Alloy | 1 | 2 | 3 | 4 | Total (g/h) |
|---|---|---|---|---|---|
| Sn63/37 | 6.55 | 6.80 | 7.05 | 6.80 | 27.2 |
| Viromet 217 | 3.8 | 5.50 | 5.60 | 6.90 | 21.80 |
| Viromet 349 | 7.20 | 6.41 | 5.45 | 5.88 | 24.94 |
| Sn/Cu0.7 | 10.36 | 10.71 | 10.70 | 10.10 | 41.87 |
| Sn/Ag/Cu | 13.95 | 10.95 | 10.50 | 12.85 | 48.06 |

FIGURE 13

SOLDERS

TECHNICAL FIELD

This invention relates to solders, and in particular, to solders which are substantially lead-free.

BACKGROUND OF THE INVENTION

Many conventional solders contain lead as a major constituent thereof. Such solders often have desirable physical properties, and the use of lead-containing solders is widespread throughout several industries, including those concerned with the production of printed circuit boards. For example, a solder containing a 63% tin and 37% lead is commonly used in wave-soldering processes.

However, there are increasing demands for lead-free solders, due, for example, to environmental considerations, and it seems likely that, within the next few years, it will be a legal requirement in several countries for solders used in the manufacture of many items to contain little or no lead.

Previous attempts to formulate lead-free solders have met with limited success. Conventional lead-free solders generally have undesirable physical properties, including poor wetting properties, low fluidity, poor compatibility with existing component coatings and excessive drossing. A particular problem which has been recognised in the use of lead-free solders is the issue of fillet lifting, where a fillet of solder at the edge of a through-plated hole in a printed circuit board tends to separate from the underlying material, for example, a nickel/gold coating. Another problem is the fact that lead-free solders tend to have a high dissolution rate for copper, so that copper is leached into the lead-free solder from components and circuit boards in contact with the solder.

As a result, some manufacturers are finding that existing soldering processes which have functioned effectively for many years must now be significantly adapted to accommodate the use of lead-free solders. In addition, the existing materials that are employed in the production of printed circuit boards may have to be replaced in order to be compatible with the use of lead-free solders. This adaptation of processes and materials is widely regarded as a poor use of resources, particularly as the standard of articles manufactured using known lead-free solders is, as indicated above, often considerably below that achievable using conventional leaded solders.

BRIEF SUMMARY OF THE INVENTION

It is an object of the present invention to provide a lead-free solder which is able to serve as a more or less direct substitute for conventional lead-containing solders.

Accordingly, in one aspect of the present invention, there is provided a substantially lead-free solder comprising: from 88.5% to 93.2% tin; from 3.5% to 4.5% silver; from 2.0% to 6.0% indium; and from 0.3% to 1.0% copper.

A solder embodying the invention may also comprise up 0.5% of an anti-oxidant or anti-skinning additive, such as phosphorous or another non-metallic compound or element.

In a preferred embodiment, the solder comprises 91.3% tin, 4.2% silver, 4.0% indium and 0.5% copper.

In another preferred embodiment, the solder comprises 91.39% tin, 4.1% silver, 4.0% indium, 0.5% copper and 0.01% phosphorous.

In another aspect of the present invention, there is provided a method of preparing a substantially lead-free solder, comprising the step of mixing tin, silver, indium and copper such that: the proportion of tin in the solder is from 88.5% to 93.2%; the proportion of silver in the solder is from 3.5% to 4.5%; the proportion of indium in the solder is from 2.0% to 6.0%; and the proportion of copper in the solder is from 0.3% to 1.0%.

A method of preparing a solder in accordance with the invention may comprise including up to 0.5% of an anti-oxidant or anti-skinning additive in the solder mixture.

A preferred method of preparing a solder in accordance with the invention comprises the step of mixing tin, silver, indium and copper such that: the proportion of tin in the solder is 91.3%; the proportion of silver in the solder is 4.2%; the proportion of indium in the solder is 4.0%; and the proportion of copper in the solder is 0.5%.

Another preferred method of preparing a solder in accordance with the invention comprises the step of mixing tin, silver, indium, copper and phosphorous such that: the proportion of tin in the solder is 91.39%; the proportion of silver in the solder is 4.1%; the proportion of indium in the solder is 4.0%; the proportion of copper in the solder is 0.5%; and the proportion of phosphorous in the solder is 0.01%.

A further aspect of the present invention provides a method of soldering, comprising the step of using a substantially lead-free solder comprising: from 88.5% to 93.5% tin; from 3.5% to 4.5% silver; from 2.0% to 6.0% indium; and from 0.3% to 1.0% copper.

Preferably, the method comprises the step of using a solder comprising 91.3% tin, 4.2% silver, 4.0% indium and 0.5% copper.

Conveniently, the method comprises the step of using a solder comprising 91.39% tin, 4.1% silver, 4.0% indium, 0.5% copper and 0.01% phosphorous.

Advantageously, the method comprises the step of wave-soldering using the substantially lead-free solder.

BRIEF DESCRIPTION OF THE DRAWINGS

In order that the present invention may be more readily understood, examples thereof will now be described, by way of example, with reference to the accompanying drawings, in which.

DETAILED DESCRIPTION OF THE INVENTION

As described above, conventional lead-free solders suffer from several drawbacks, including poor wetting properties, low fluidity, poor compatibility with existing component coatings, fillet lifting, high copper dissolution rates and excessive drossing when compared with conventional solders containing lead.

However, it has now been found that a solder embodying the present invention and composed of a lead-free alloy comprising from 88.5% to 93.2% tin, from 3.5% to 4.5% silver, from 2.0% to 6.0% indium, from 0.3% to 1.0% copper and up to 0.5% of an anti-oxidant or anti-skinning additive, such as phosphorous or another non-metallic compound or element, possesses significantly improved properties when compared with known lead-free solders. Indeed the properties of solders embodying the present invention are comparable to conventional solders containing lead as regards wettability, fluidity, compatibility with existing component coatings, fillet lifting, copper dissolution rate and drossing.

In order to demonstrate the advantageous properties of solders embodying the present invention, five tests were carried out, as will be described below. These tests were carried out on a preferred embodiment of the solder of the present invention which is herein called ALLOY 349 and comprises 91.39% tin, 4.2% silver, 4.0% indium, 0.5% copper and 0.01% phosphorous.

Test 1: Wetability

The first test concerned the wetability of a sample of the solder embodying the present invention, as compared to samples of a selection of known solders, namely eight existing lead-free solders and a conventional lead-containing solder.

The nine known solders were as follows:
1. A lead-containing solder of the composition: 63% Sn; 37% Pb.
2. A first lead-free solder of the composition: 99.3% Sn; 0.7% Cu.
3. A second lead-free solder of the composition: 96.5% Sn; 3.5Ag.
4. A third lead-free solder (herein called VIROMET 217) of the composition: 88.3% Sn; 3.2% Ag; 4.5% Bi; 4.0% In.
5. A fourth lead-free solder (herein called VIROMET 411) of the composition: 92% Sn; 2% Cu; 3% Ag; 3% Bi.
6. A fifth lead-free solder (herein called VIROMET 513) of the composition: 92.8% Sn; 0.7% Cu; 0.5% Ga; 6% In.
7. A sixth lead-free solder of the composition: 93.5% Sn; 3.5% Ag; 3.0% Bi.
8. A seventh lead-free solder of the composition: 95.5% Sn; 4.0% Ag; 0.5% Cu.
9. An eighth lead-free solder of the composition: 96.0% Sn; 2.5% Ag; 1.0% Bi; 0.5% Cu.

A first aspect of the first test comprised the measurement of the wetting time, based on the ANSI/J Std-003 standard, for the solders under consideration at a variety of temperatures ranging from 235° C. to 265° C. In this test, a specimen of copper was immersed in a quantity of each molten solder. A sensitive force measuring device was connected to the copper specimen, and arranged so that vertical forces on the specimen could be measured and recorded.

The variation in the vertical force upon the copper specimen during immersion thereof in the molten solders is due to two main factors. The first of these, the buoyancy force, arises from the upward force exerted on the specimen due to the displacement of solder, which is equal to the weight of solder displaced by the specimen. Since the volume of the part of the specimen that was immersed in the solder, and the density of the solder, are known, this upward force can be calculated and taken into account.

The second factor is a force acting on the specimen due to the change in contact angle between the surface of the solder and the surface of the specimen. The wetting time in each particular case was defined as the time taken for the wetting force acting on the specimen to be equal to zero.

Figure 1:
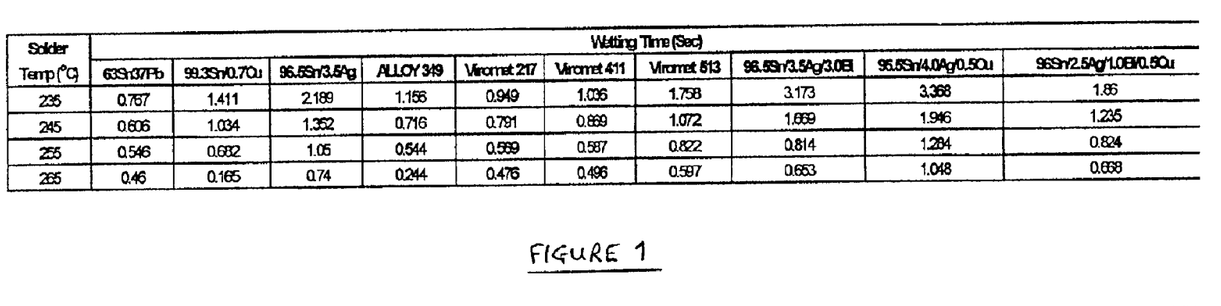
FIG. 1 is a table of wetting times, in seconds, at a variety of temperatures, for a selection of different solders, including a solder embodying the invention.

The results of the first aspect of the first test are shown in FIG. 1. In summary, the solder embodying the present invention exhibited a wetting time, at each of the temperatures, that was comparable to that displayed by the conventional lead-containing solder. In addition, the solder embodying the present invention exhibited a wetting time which was generally lower than that displayed by any of the other lead-free solders. The wetting time is a measure of the rapidity with which a solder adheres to a substance, and clearly a low wetting time is a desirable property for a solder. Hence it can be seen that the solder embodying the present invention performed better overall in the first aspect of the first test than any of the existing lead-free solders.

Figure 2:
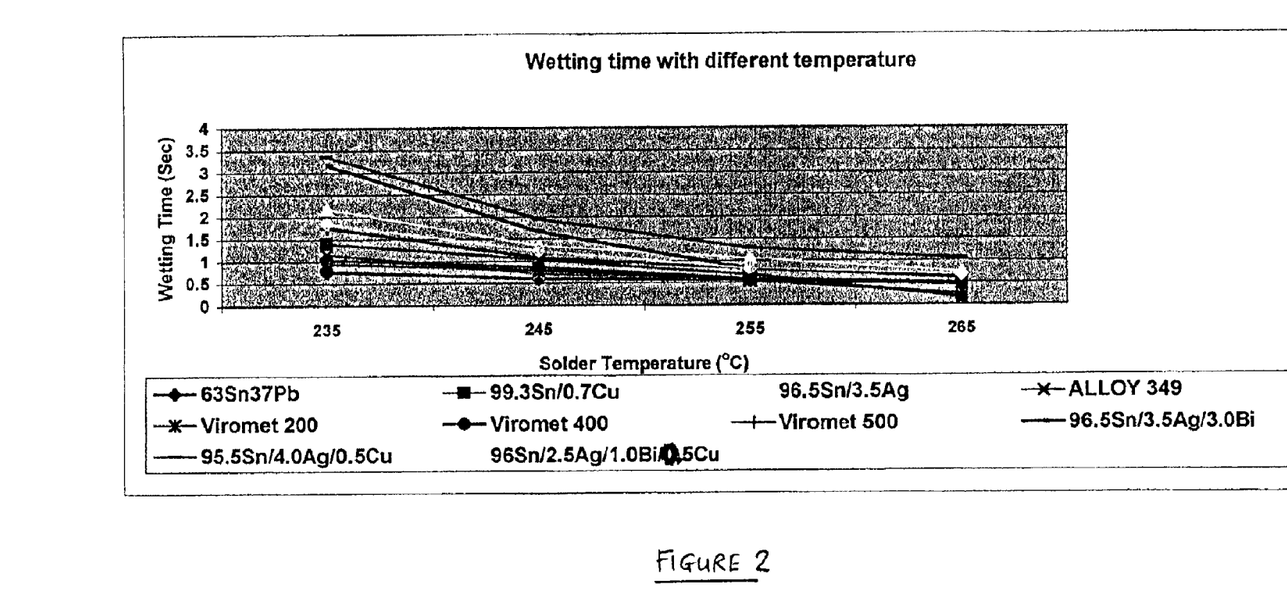
FIG. 2 is a graphical representation of the data expressed in the table of FIG. 1.

The results of the first aspect of the first test are displayed in graphical form in FIG. 2. It will be seen from this graph that the results representing the performances of the conventional solder containing lead and the solder embodying the present invention follow each other quite closely when compared to those representing the performances of the other lead-free solders.

A second aspect of the first test comprised the measurement of the maximum wetting force at 2.0 seconds after immersion of the specimen in the respective solders. The wetting force is, as described above, the adhesive force between the solder and the specimen. Clearly, the wetting force provides a useful indication of the strength with which a solder binds to a substrate, and a high wetting force is a desirable property for a solder.

Figure 3:
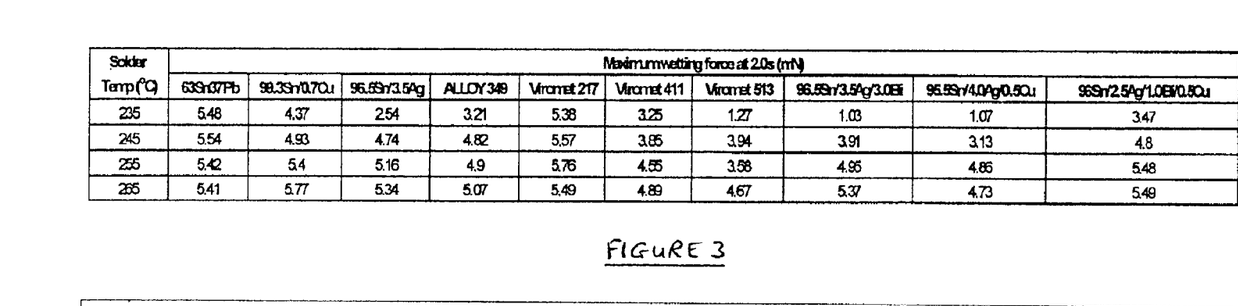
FIG. 3 is a table of maximum wetting force, at a variety of temperatures, for a selection of different solders, including a solder embodying the present invention.

The results of the second aspect of the first test are shown in FIG. 3. To summarise these results, the solder embodying the present invention exhibited a maximum wetting force 2.0 seconds after immersion of the specimen therein, at each of the considered temperatures, that was comparable to that displayed by the conventional lead-containing solder, although somewhat lower. While some of the existing lead-free solders displayed a wetting force that was closer to that of the conventional leaded solder at some temperatures, only VIROMET 217 produced slightly better overall results and the solder of the present invention exhibited a wetting force that was close to that of the conventional lead-containing solder at all of the considered temperatures. This property of the solder embodying the present invention allows the solder of the invention to behave in a similar manner to conventional lead-containing solders under a variety of temperature conditions, or where soldering takes place under varying temperature conditions.

Figure 4:
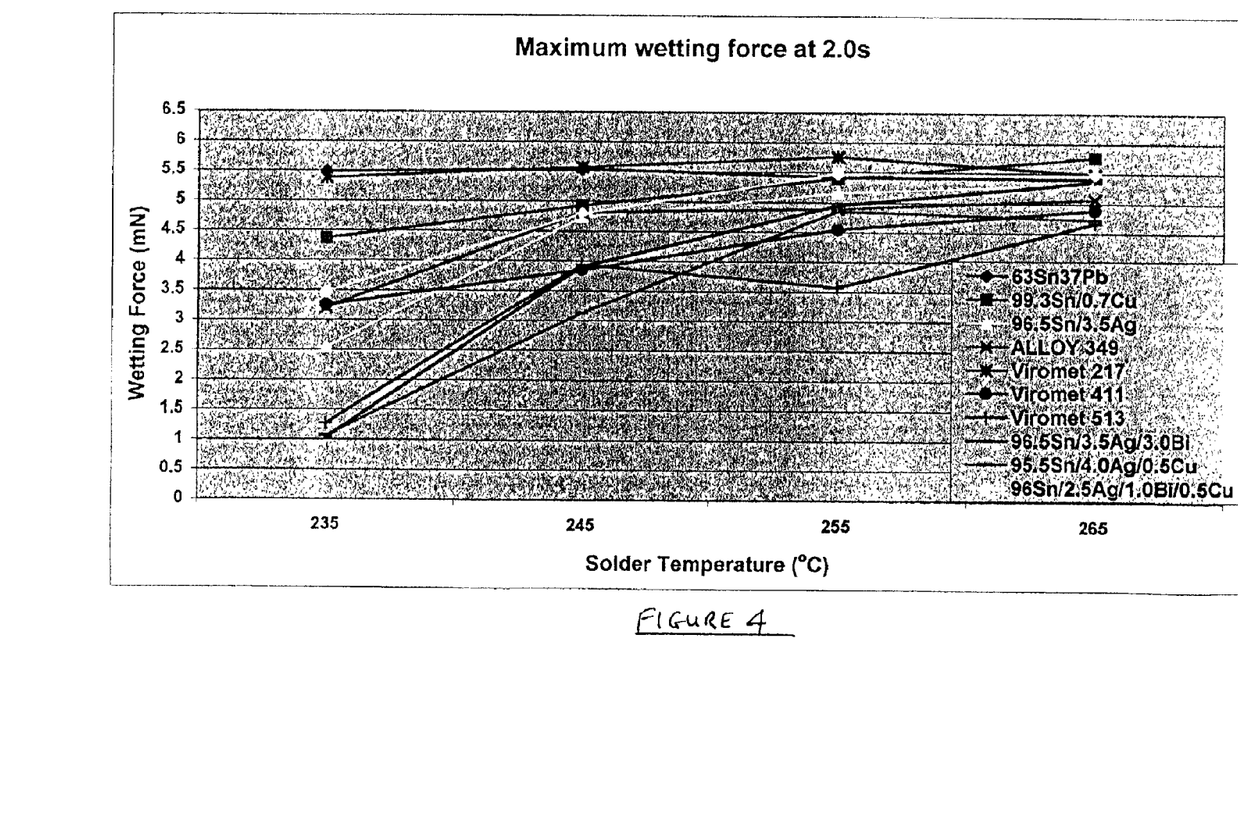
FIG. 4 is a graphical representation of the data expressed in the table of FIG. 3.

The results of the second aspect of the first test are displayed in graphical form in FIG. 4, which clearly shows that the results for the solder embodying the present invention follow those representing the conventional lead-containing solder at least as closely as the best of those representing the other lead-free solders.

From the results of the first test, it can be seen that the solder embodying the present invention exhibits very similar properties, with regard to wettability, to the conventional lead-containing solder. Clearly, this similarity in physical properties renders the solder embodying the present invention suitable for use as a replacement for the conventional lead-containing solder.

Test 2: Mechanical Properties

A second test compared the mechanical properties of the solder of the present invention with the mechanical properties of a conventional lead-containing solder. In this second test, various mechanical tests were carried out in accordance with the ASTM standard to compare the properties of ALLOY 349, the solder embodying the present invention, with a conventional lead-containing solder with the composition 63% Sn/37% Pb and seven other existing lead-free solders, with the following compositions:
1. A first lead-free solder: 99.3% Sn; 0.7% Cu.
2. A second lead-free solder: 96.5% Sn; 3.5Ag.
3. A third lead-free solder (herein called VIROMET 217): 88.3% Sn; 3.2% Ag; 4.5% Bi; 4.0% In.
4. A fourth lead-free solder (herein called VIROMET HF): 92.8% Sn; 0.7% Cu; 0.5% Ga; 6% In.
5. A fifth lead-free solder: 93.5% Sn; 3.5% Ag; 3.0% Bi.
6. A sixth lead-free solder: 95.5% Sn; 4.0% Ag; 0.5% Cu.
7. A seventh lead-free solder: 96% Sn; 2.5% Ag; 0.5% Cu; 1.0% Bi.

A first aspect of this second test involved determining the melting temperature, the coefficient of thermal expansion (CTE) and the specific gravity (SG) of the solders under test. The results of this first aspect of the second test are tabulated in FIG. 5 and illustrated in graphical form in FIG. 6.

Figure 5:
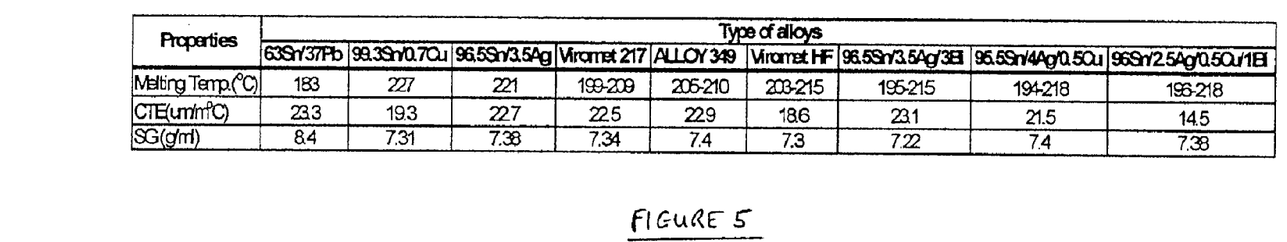
FIG. 5 is a table showing physical properties, including the coefficient of thermal expansion, of a selection of solders, including a solder embodying the present invention.
Figure 6:
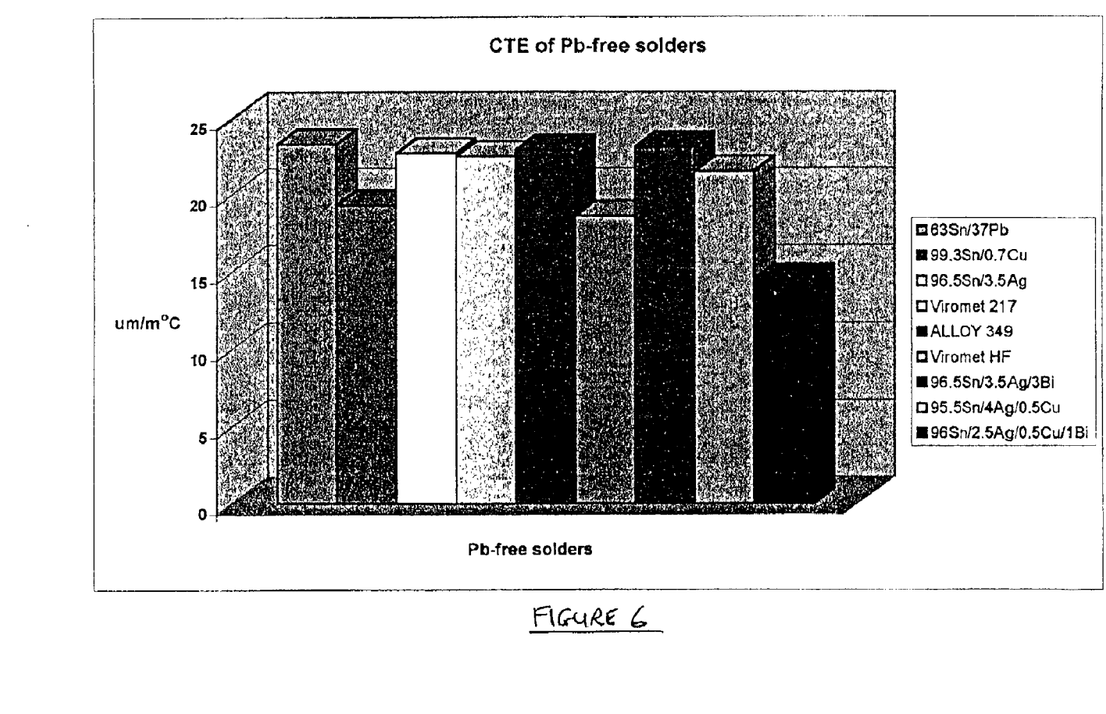
FIG. 6 is a graphical representation of the thermal expansion data expressed in the table of FIG. 5.

As will be appreciated from the table and graph, the ALLOY 349 solder of the present invention proved to have a thermal expansion co-efficient which is very close to the conventional lead-containing solder, so that any fear of incompatibility between the invention and existing components and boards is significantly reduced.

A second aspect of the second test involved measuring the tensile strength, load at maximum load, yield strength and Young's Modulus of the various solders. The results of these tests are expressed in full in the table of FIG. 7, while FIG. 8 graphically shows the tensile strength and yield strength of each of the alloys.

Figure 7:
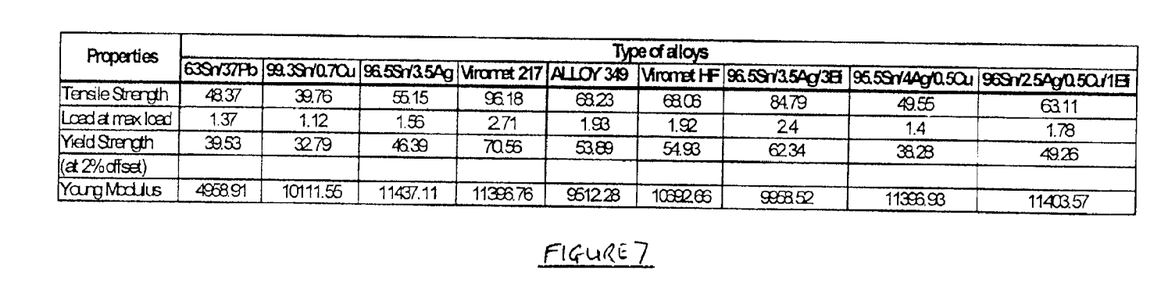
FIG. 7 is a table of mechanical properties, including tensile strength and yield strength, for a selection of different solders, including a solder embodying the present invention.
Figure 8:
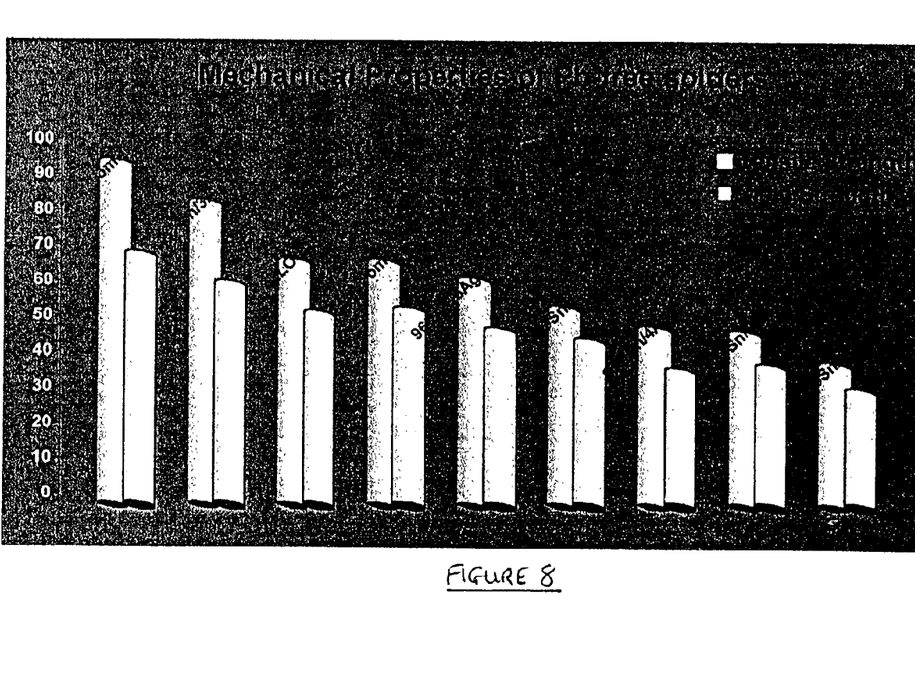
FIG. 8 is a graphical representation of the tensile strength and yield strength data expressed in the table of FIG. 7.

As will be seen from FIGS. 7 and 8, the results of this test demonstrate that the ALLOY 349 solder embodying the present invention has a better strength and better Young's Modulus compared to the conventional lead-containing solder, thereby indicating that fillet joints made of the alloy in accordance with the invention can potentially be much stronger than joints made from the conventional lead-containing solder.

Test 3: Fillet Lifting

The increasing use of lead-free solders in the various industries has shown that there is a tendency for fillet lifting to occur when lead-free solders are used in the context of printed circuit boards with through-plated holes employing both OSP and Ni/Au coatings.

In a third test, the occurence of such fillet lifting was tested for a selection of lead-free solders, namely the ALLOY 349 solder embodying the present invention and the following six existing lead-free solders:
1. A first lead-free solder: VIROMET 217.
2. A second lead-free solder: 92.3% Sn; 3.2% Ag; 0.5% Bi; 4.0%.
3. A third lead-free solder: 89.8% Sn; 3.2% Ag; 1.0% Bi; 6.0% In.
4. A fourth lead-free solder: 88.8% Sn; 3.2% Ag; 2.0% Bi; 6.0% In.
5. A fifth lead-free solder: 94.5% Sn; 4.0% Ag; 0.5% Cu; 1.0% Bi.
6. A sixth lead-free solder: 96.5% Sn; 3.5% Ag.

Figure 9:
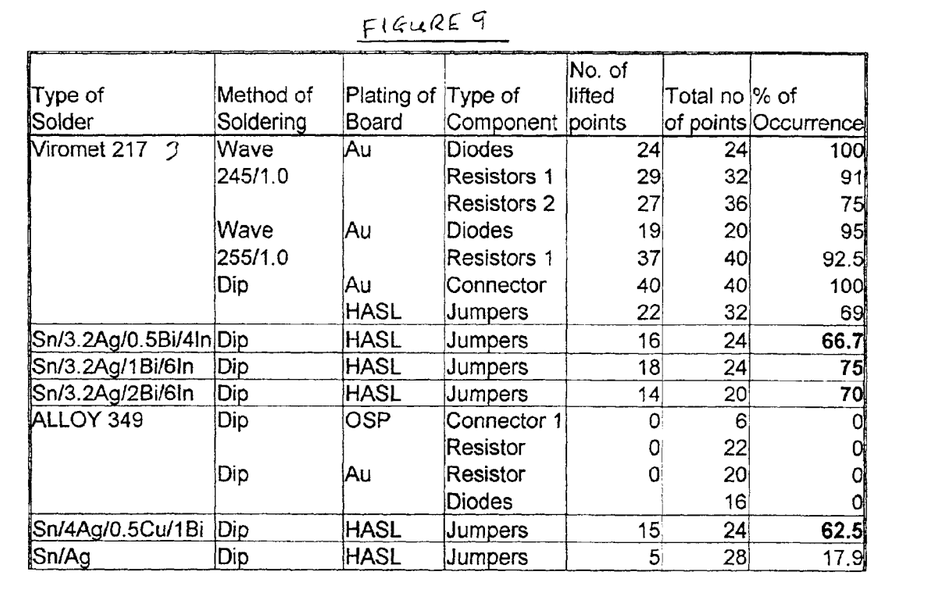
FIG. 9 is a table of results obtained in fillet lifting tests conducted on a selection of different lead-free solders, including a solder embodying the present invention.
Figure 10A:
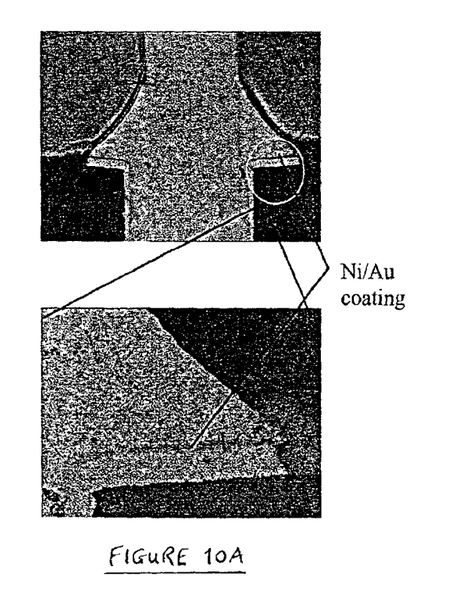
FIG. 10A is a pair of micrograph images showing fillets of the solder embodying the invention adhering to nickel/gold and OSP coatings (polymer coatings on a copper substrate)
Figure 10B:
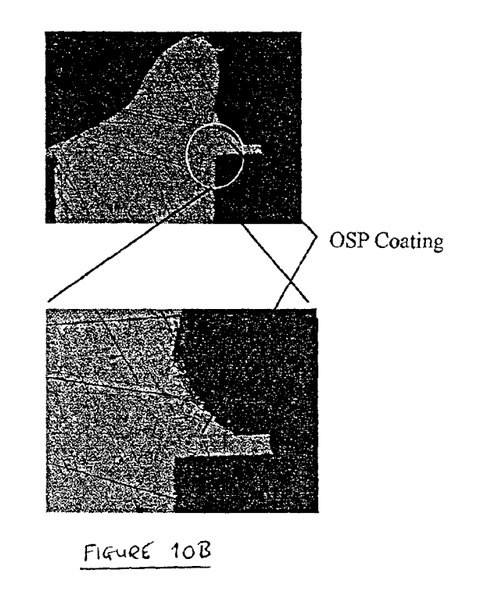
FIG. 10B is a pair of micrograph images on a different scale from the micrograph images of FIG. 10A and showing fillets of the solder embodying the invention adhering to nickel/gold and OSP coatings.

The results of this third test are illustrated in FIGS. 9, 10A and 10B, FIG. 9 showing the results in tabulated form. FIGS. 10A and 10B show micrographs, on two different scales, of fillet joints formed using the ALLOY 349 solder embodying the present invention on Ni/Au and OSP coatings, respectively. These results clearly indicate that the use of a solder embodying the present invention enables the elimination of fillet lifting defects in the context of OSP and nickel/gold coated through-holes in printed circuit boards.

Test 4: Copper Dissolution Rate

A fourth test was carried out to compare the copper dissolution rate in a lead-free solder embodying the present invention with a conventional lead-containing solder (63% Sn/37% Pb) and three existing lead-free solders as follows;
1. A first lead-free solder: VIROMET 217.
2. A second lead-free solder: 99.3% Sn; 0.7% Cu.
3. A third lead-free solder: 95.5% Sn; 4.0% Ag; 0.5% Cu.

The testing was carried out by dipping a known weight of fluxed copper plate into the melted solder and the concentration of the copper in the solder was subsequently measured using inductively coupled plasma equipment. The rate of copper dissolution was then calculated on the basis of the concentration of the copper found in the solder against the weight of copper dipped in the solder.

Figure 11:
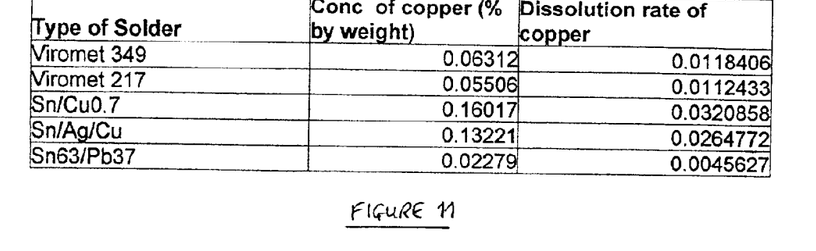
FIG. 11 is a table showing the dissolution rate of copper into various types of solder, including a lead-free solder embodying the present invention.
Figure 12:
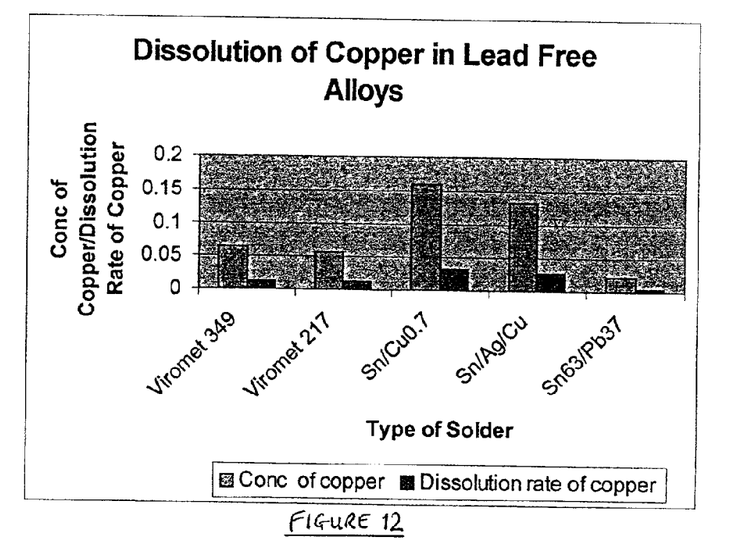
FIG. 12 is a graphical representation of the data expressed in the table of FIG. 1.

The results of this fourth test are expressed in FIGS. 11 and 12, which respectively show the results in tabulated form and in graphical form. As will be seen from FIGS. 11 and 12, the alloy embodying the present invention has a slightly higher rate of copper dissolution than the conventional lead-containing solder but also has one of the lowest copper dissolution rates found in the lead-free solders tested.

Test 5: Drossing

A fifth test was concerned with the suitability of the solder of the present invention for use in a wave-soldering machine. In an example of wave-soldering, a circuit board is held just above the surface of a quantity of molten solder in a pot. A wave is then caused to propagate across the surface of the molten solder, of sufficient amplitude that the crest of the wave comes into contact with the surface of the circuit board. The wave is as wide as the circuit board (or the portions thereof that require soldering), and as the wave propagates across the surface of the molten solder all parts of the downward-facing surface of the circuit board are contacted with molten solder.

When using existing lead-free solders, the levels of dross present in the pot after several uses have been found in some cases to be unacceptably high.

A fifth test was carried out to determine the extent of drossing when using the ALLOY 349 solder embodying the present invention compared with the conventional 63% Sn/37% Pb solder and with three other existing lead-free solders, as follows:

1. A first lead-free solder: VIROMET 217.
2. A second lead-free solder: 99.3% Sn; 0.7% Cu.
3. A third lead-free solder: 95.5% Sn; 4.0% Ag; 0.5% Cu.

Figure 13:
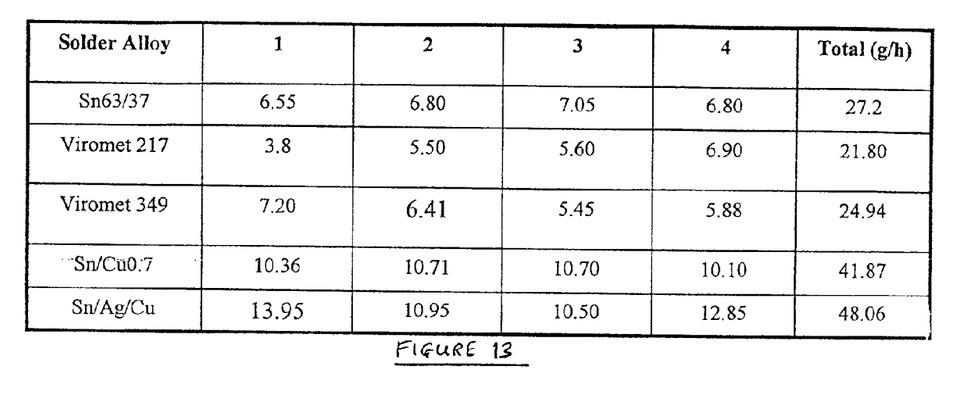
FIG. 13 is a table showing the level of drossing exhibited by various solders, including a lead-free solder embodying the present invention.

In this test, the solder being tested was used in a pot of molten solder in a simulated conventional wave-soldering machine. No alteration of the machine was made to accommodate the use of the solder and the wave-soldering machine was used to solder circuit boards in the same way as for a conventional tin/lead solder. The wave-soldering machine was operated in a normal air environment at a pot temperature of 245° C., with the boards being conveyed over the surface of the pot at a speed of 1.4 to 1.8 m/min. At the end of each of four successive 15 minute periods of operation, the dross in the pot was removed and weighed to determine the amount of dross produced by the wave-soldering process in each period. The weights were then totalled to give a measurement of the rate of dross production per hour. The results of this fifth test are tabulated in FIG. 13 which demonstrates clearly that the solder embodying the present invention produces drossing to a degree which is lower than all but one of the other lead-free solders and is lower than the drossing found with the conventional lead-containing solder.

As will be appreciated from the above results, the present invention provides a lead-free solder that is very suitable for use as a direct replacement for conventional lead-containing solders, due to the comparable characteristics of wettability, fluidity, compatibility with existing component coatings, fillet lifting and drossing exhibited by the solder of the present invention.

Consequently, the need for manufacturers to replace existing machinery, processes or component coatings to accommodate use of a lead-free solder can be eliminated or substantially reduced by employing a solder embodying the present invention. As a result, the process of converting a manufacturer's facility to the use of lead-free solder may be rendered far simpler and more economically viable than hitherto contemplated.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A solder for use in wave-soldering consisting of:
   from 88.5% to 93.2% tin;
   from 3.5% to 4.5% silver;
   from 2.0% to 6% indium;
   from 0.3% to 1% copper; and
   0.01% phosphorous.

2. A solder according to claim 1 further consisting of 91.3% tin, 4.2% silver, 4.0% indium, 0.5% copper and 0.01% phosphorous, and said solder having a Young's Modulus of 9512 MPa.

3. A method of preparing a solder for use in wavesoldering process, said method consisting of the steps of:
   (a) mixing tin, silver, indium, copper and phosphorous to form the solder consisting of 88.5% to 93.2% tin; solder is from 3.5% to 4.5% silver; 2.0% to 6% indium, 0.3% to 1.0% copper, and 0.01% phosphorous.

4. A method according to claim 3 which further consists of mixing tin, silver, indium, copper, and phosphorous such that:
   the proportion of tin in the solder is 91.3%;
   the proportion of silver in the solder is 4.2%;
   the proportion of indium in the solder is 4%;
   the proportion of copper in the solder is 0.5%, and
   the proportion of phosphorous is 0.01%.

5. A method of soldering, consisting of the steps of:
   (a) forming a solder consisting of tin, silver, indium, copper and phosphorous by combining tin, silver, indium, copper and phosphorous in the following proportions:
   from 88.5% to 93.2% tin;
   from 3.5% to 4.5% silver;
   from 2.0% to 6.0% indium;
   from 0.3% to 1.0% copper; and
   0.01% phosphorous, wherein the solder has a Young's Modulus of 9512 MPa; and
   (b) using the solder formed in step (a) to solder in a wave-soldering process.

* * * * *